United States Patent
Kim et al.

(10) Patent No.: US 10,580,574 B1
(45) Date of Patent: Mar. 3, 2020

(54) ELECTRONIC COMPONENT

(71) Applicant: SAMSUNG ELECTRO-MECHANICS CO., LTD., Suwon-si, Gyeonggi-do (KR)

(72) Inventors: Ho Yoon Kim, Suwon-Si (KR); Sang Soo Park, Suwon-Si (KR); Woo Chul Shin, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/195,499

(22) Filed: Nov. 19, 2018

(30) Foreign Application Priority Data

Sep. 13, 2018 (KR) ........................ 10-2018-0109372

(51) Int. Cl.
*H01G 4/30* (2006.01)
*H01G 4/002* (2006.01)
(Continued)

(52) U.S. Cl.
CPC .............. *H01G 4/002* (2013.01); *H01G 4/248* (2013.01); *H01G 4/30* (2013.01); *H01G 4/012* (2013.01);
(Continued)

(58) Field of Classification Search
CPC ............ H01G 4/012; H01G 4/12; H01G 4/30; H01G 4/232; H01G 4/248; H01G 4/2325;
(Continued)

(56) References Cited

U.S. PATENT DOCUMENTS 9,313,892 B2 * 4/2016 Hattori ................... H05K 1/141
2007/0188975 A1 * 8/2007 Togashi ................ H01G 2/065
361/306.3
(Continued)

FOREIGN PATENT DOCUMENTS

JP 6248644 B2 12/2017
KR 10-1476391 B1 12/2014
(Continued)

OTHER PUBLICATIONS

Office Action issued in corresponding Korean Application No. 10-2018-0109372, dated May 22, 2019.

*Primary Examiner* — Nguyen T Ha
(74) *Attorney, Agent, or Firm* — Morgan, Lewis & Bockius LLP

(57) ABSTRACT

An electronic component includes a multilayer capacitor, including a capacitor body, and a pair of external electrodes disposed on both ends of the capacitor body, respectively, and an interposer, including an interposer body, and a pair of external terminals disposed on both ends of the interposer body, respectively. The pair of external terminals include bonding portions disposed on a top surface of the interposer body, mounting portions disposed on a bottom surface of the interposer body, and connection portions disposed on end surfaces of the interposer to connect the bonding portions and the mounting portions to each other. The mounting portions have lengths greater than lengths of the bonding portions in a direction of connection of the pair of external terminals.

13 Claims, 4 Drawing Sheets

(51) Int. Cl.
*H01G 4/248* (2006.01)
*H01G 4/012* (2006.01)
*H01G 4/12* (2006.01)

(52) U.S. Cl.
CPC ......... *H01G 4/1227* (2013.01); *H01G 4/1245* (2013.01)

(58) Field of Classification Search
CPC ......... H05K 1/181; H05K 2201/10015; H05K 1/18; H05K 3/321; H05K 3/303
See application file for complete search history.

(56) References Cited

U.S. PATENT DOCUMENTS

| | | | |
|---|---|---|---|
| 2013/0037911 A1* | 2/2013 | Hattori | H01L 28/40 257/532 |
| 2015/0122534 A1 | 5/2015 | Park et al. | |
| 2015/0206661 A1* | 7/2015 | Fujimura | H01G 4/30 361/301.4 |
| 2016/0227651 A1* | 8/2016 | Mori | H05K 1/181 |
| 2016/0309578 A1* | 10/2016 | Park | H01G 4/248 |
| 2017/0290161 A1* | 10/2017 | Shimura | H01G 4/12 |

FOREIGN PATENT DOCUMENTS

| | | |
|---|---|---|
| KR | 101525689 B1 | 6/2015 |
| KR | 10-2017-0028610 A | 3/2017 |

* cited by examiner

ELECTRONIC COMPONENT

CROSS-REFERENCE TO RELATED APPLICATION(S)

This application claims benefit of priority to Korean Patent Application No. 10-2018-0109372 filed on Sep. 13, 2018 in the Korean Intellectual Property Office, the disclosure of which is incorporated herein by reference in its entirety.

TECHNICAL FIELD

The present disclosure relates to an electronic component.

BACKGROUND

A multilayer capacitor has been used as a component of various electronic devices due to advantages thereof, such as compactness and high capacitance.

Such a multilayer capacitor includes a plurality of dielectric layers and internal electrodes, having different polarities, alternately laminated between the dielectric layers.

The dielectric layers have piezoelectric properties. Accordingly, when a DC or an AC voltage is applied to the multilayer capacitor, a piezoelectric phenomenon may occur between the internal electrodes to generate periodic vibrations while expanding and contracting a capacitor body.

Vibrations may be transferred to a board through solders connecting external electrodes to the board. Thus, the entire board may serve as an acoustically reflective surface to generate vibratory sound as noise.

Vibratory sound may correspond to audio frequencies ranging from 20 Hz to 2000 Hz, causing listener discomfort, and such vibratory sound which may cause listener discomfort is known as acoustic noise.

To reduce acoustic noise, research into an electronic component using an interposer disposed between a multilayer capacitor and a board has been conducted.

However, in the case of a related-art electronic component using an interposer, an acoustic noise reducing effect may not be as effective as expected, or fixing strength may not be ensured during board mounting, resulting in poor mounting.

Accordingly, there is a need for a technique able to secure fixing strength of a predetermined level or higher, while effectively reducing acoustic noise of a multilayer capacitor.

SUMMARY

An aspect of the present disclosure is to provide an electronic component which may prevent poor mounting while maintaining an acoustic noise reducing effect above a predetermined level.

According to an aspect of the present disclosure, an electronic component includes a multilayer capacitor, including a capacitor body, and a pair of external electrodes disposed on both ends of the capacitor body, respectively, and an interposer, including an interposer body, and a pair of external terminals disposed on both ends of the interposer body, respectively. The pair of external terminals include bonding portions disposed on a top surface of the interposer body, mounting portions disposed on a bottom surface of the interposer body, and connection portions disposed on end surfaces of the interposer to connect the bonding portions and the mounting portions to each other. The mounting portions have lengths greater than lengths of the bonding portions in a direction of connection of the pair of external terminals.

Each of the bonding portions may have a length of 0.3 millimeter or more, and each of the mounting portions may have a length of 0.5 millimeter or less.

The external terminals may have '['-shaped and ']'-shaped end portions.

The interposer body may have a length and a width smaller than a length and a width of the capacitor body, respectively.

The interposer body may be formed of alumina.

The capacitor body may have first and second surfaces disposed to oppose each other, third and fourth surfaces connected to the first and second surfaces and disposed to oppose each other, and fifth and sixth surfaces connected to the first and second surfaces as well as the third and fourth surfaces and disposed to oppose each other, and may include a plurality of dielectric layers and a plurality of first and second internal electrodes alternately disposed with the dielectric layers interposed therebetween. Ends of the first internal electrodes and ends of the second internal electrodes may be exposed through the third and fourth surfaces, respectively.

The pair of external electrodes may include connection portions disposed on the third and fourth surfaces of the capacitor body, respectively, and band portions extending from the connection portions to a portion of the first surface of the capacitor body.

The electronic component may further include adhesive layers respectively provided between the band portions and the bonding portions.

The plurality of dielectric layers and the plurality of first and second internal electrodes may be alternately disposed with the dielectric layers interposed therebetween in a direction of connection of the fifth and sixth surfaces.

The electronic component may further include plating layers respectively provided on surfaces of the external electrodes and the external terminals.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
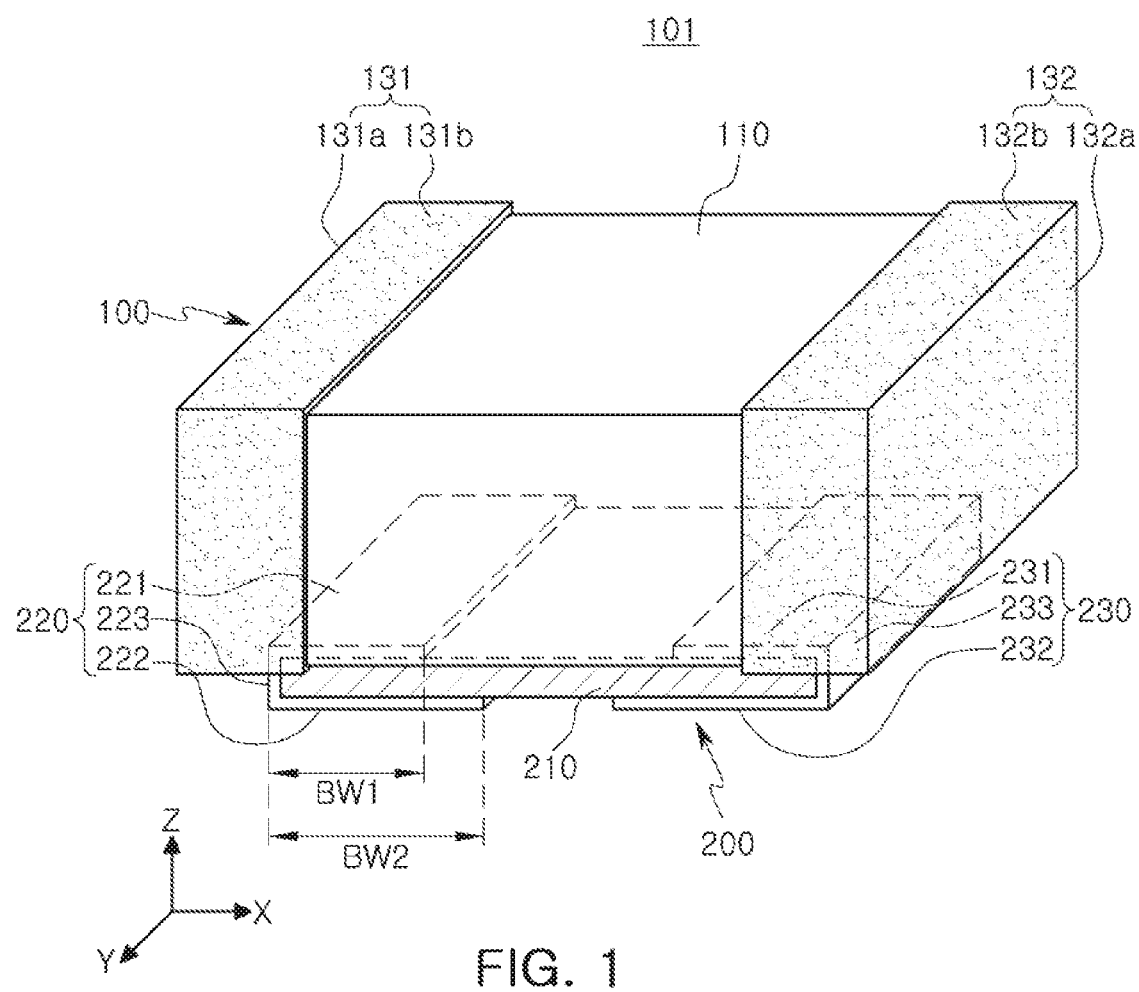
FIG. 1 is a perspective view of an electronic component according to an exemplary embodiment in the present disclosure.

Hereinafter, embodiments in the present disclosure will be described as follows with reference to the attached drawings.

The present disclosure may, however, be embodied in many different forms and should not be construed as being limited to the embodiments set forth herein.

Rather, these embodiments are provided so that this disclosure will be thorough and complete, and will fully convey the scope of the present disclosure to those skilled in the art.

In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

To clarify embodiments in the present disclosure, directions may be defined as follows: X, Y, and Z indicated in drawings denote a length direction, a width direction, and a thickness direction of a multilayer capacitor and an interposer, respectively.

In exemplary embodiments, the Y direction may be used to have the same concept as a lamination direction in which dielectric layers are laminated.

Figure 3:
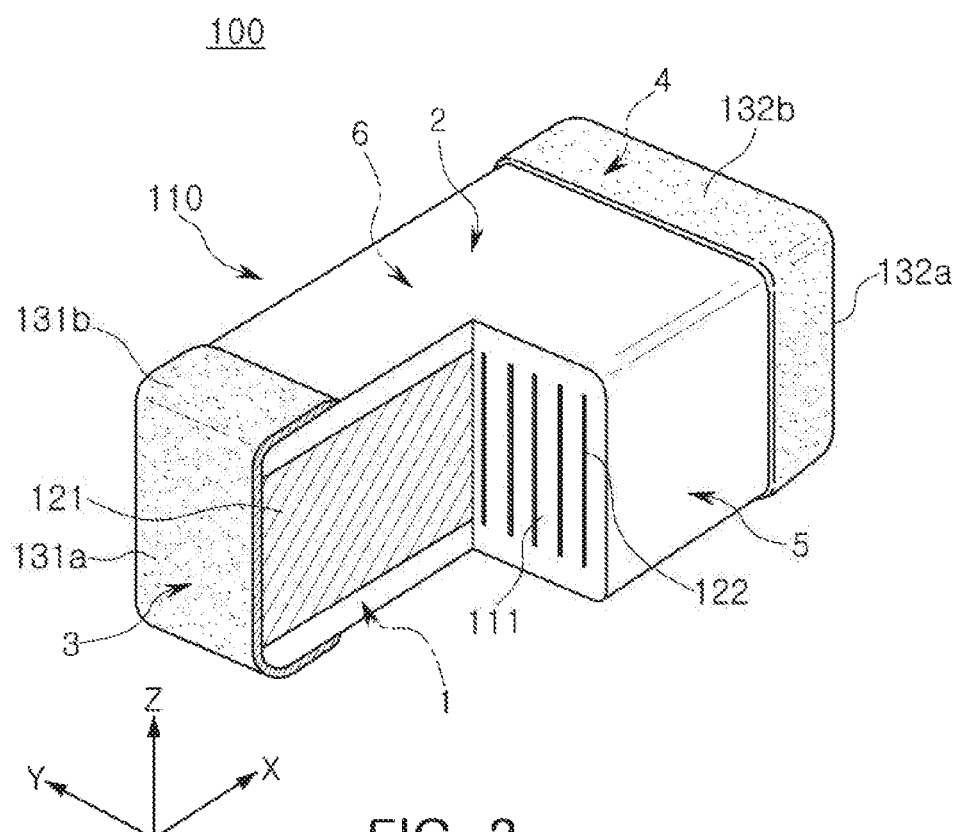
FIG. 3 is a partially cut-away perspective view of a multilayer capacitor in FIG. 1.
Figure 4A:
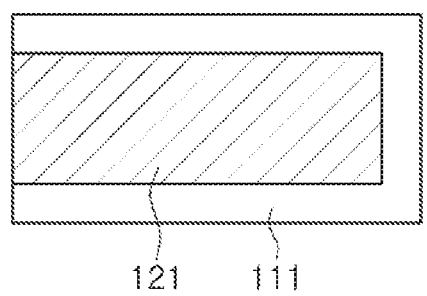
FIGS. 4A and 4B are plan views of first and second internal electrodes of the multilayer capacitor in FIG. 3, respectively.
Figure 4B:
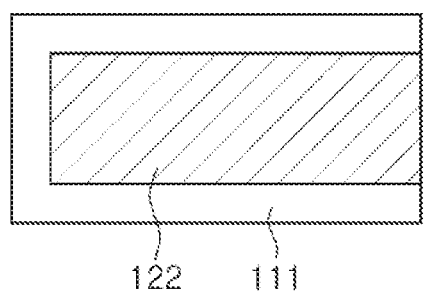

FIG. 3 is a partially cut-away perspective view of a multilayer capacitor in FIG. 1, and FIGS. 4A and 4B are plan views of first and second internal electrodes of the multilayer capacitor in FIG. 3, respectively.

Hereinafter, a structure of a multilayer capacitor applied to an electronic component according to an exemplary embodiment will be described with reference to FIGS. 3 to 4B.

A multilayer capacitor 100 includes a capacitor body 110, and first and second external electrodes 131 and 132 disposed on both ends of the capacitor body 110 in an X direction, respectively.

The capacitor body 110 is formed by laminating the plurality of dielectric layers 111 and sintering the laminated dielectric layers 111 which may be integrated with each other such that boundaries therebetween may not be readily apparent without using a scanning electron microscope (SEM).

In addition, the capacitor body 110 includes a plurality of dielectric layers 111 and first and second internal electrodes 121 and 122 having different polarities alternately disposed in a Y direction with the dielectric layers 111 interposed therebetween.

The capacitor body 110 may include an active region as a portion contributing to formation of capacitance of a capacitor, and cover regions as margin portions prepared in both side portions of the capacitor body 110 in Y direction and prepared in upper and lower portions of the active region in the Z direction, respectively.

The capacitor body 110 is not limited in shape, but may have a hexahedral shape. The capacitor body 110 may have first and second surfaces 1 and 2 disposed to oppose each other in the Z direction, third and fourth surfaces 3 and 4 connected to the first and second surfaces 1 and 2 and disposed to oppose each other in the X direction, and fifth and sixth surfaces 5 and 6 connected to the first and second surfaces 1 and 2 as well as the third and fourth surfaces 3 and 4 and disposed to oppose each other.

The dielectric layer 111 may include a ceramic powder, for example, a barium titanate ($BaTiO_3$)-based ceramic powder or the like.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca) or zirconium (Zr) is partially employed in $BaTiO_3$, but a material of the ceramic powder is not limited thereto.

In addition to the ceramic powder, a ceramic additive, an organic solvent, a plasticizer, a binders, and a dispersant may be further added to the dielectric layer 111.

The ceramic additive may include, for example, a transition metal oxide or a transition metal carbide, a rare earth element, magnesium (Mg), aluminum (Al), or the like.

The first and second internal electrodes 121 and 122, as electrodes applied with different polarities, may be disposed on the dielectric layer 111 to be laminated in the Y direction. The first and second internal electrodes 121 and 122 may be alternately disposed to oppose each other with a single dielectric layer 111 interposed therebetween inside the capacitor body 110 in Y direction.

In this case, the first and second internal electrodes 121 and 122 may be electrically insulated from each other by the dielectric layer 111 disposed in the middle thereof.

While a structure in which internal electrodes are laminated in the Y direction has been described in the present disclosure, the present disclosure is not limited to the structure. If necessary, the present disclosure may be applied to a structure in which internal electrodes are laminated in the Z direction.

One end of the first electrode 121 and one end of the second internal electrode 122 may be exposed through the third and fourth surfaces 3 and 4 of the capacitor body 110, respectively.

The ends of the first and second electrodes 121 and 122 alternately exposed through the third and fourth surfaces 3 and 4 of the capacitor body 110 may be connected to the first and second external electrodes 131 and 132 disposed on both ends of the capacitor body 110 in the X direction, which will be described later, to be electrically connected thereto, respectively.

According to the above-described configuration, charges are accumulated between the first and second internal electrodes 121 and 122 when a predetermined voltage is applied to the first and second external electrodes 131 and 132.

In this case, capacitance of the multilayer capacitor 100 may be proportional to an overlapping area between the first and second internal electrodes 121 and 122 overlapping each other in the active region in the Y direction.

The first and second inner electrodes 121 and 122 may be formed using a conductive paste formed of at least one of a noble metal material such as platinum (Pt), palladium (Pd), and a palladium-silver (Pd—Ag) alloy, nickel (Ni), and copper (Cu), but a material thereof is not limited thereto.

The conductive paste may be printed by means of a screen printing method, a gravure printing method, or the like, but the printing method is not limited thereto.

In the present embodiment, an internal electrode of the capacitor body 110 is shown as being laminated in a direction perpendicular to the first surface 1, a mounting surface. However, an internal electrode of the present disclosure may be laminated in a direction horizontal to the mounting surface, if necessary.

The first and second external electrodes 131 and 132 may be provided with voltages having different polarities and may be disposed on both ends of the capacitor body 110 in the X direction. The first and second external electrodes 131 and 132 may be connected to the exposed ends of the first and second internal electrodes 121 and 122, respectively, to be electrically connected to each other.

The first external electrode 131 may include a first head portion 131a and a first band portion 131b.

The first band portion 131b is disposed on the third surface 3 of the capacitor body 110 and is in contact with an end exposed outwardly of the first internal electrode 121 through the third surface 3 of the capacitor body to electrically connect the first internal electrode 121 to the first external electrode 131.

The first band portion 131b is a portion extending from the first head portion 131a to portions of the first, second, fifth, and sixth surfaces 1, 2, 5, and 6 of the capacitor body 110 to improve fixing strength or the like.

The second external electrode 132 may include a second head portion 132a and a second band portion 132b.

The second head portion 132a is disposed on the fourth surface 4 of the capacitor body 110 and is in contact with an end exposed outwardly of the second internal electrode 122 through the fourth surface 4 of the capacitor body 110 to electrically connect the second internal electrode 122 to the second external electrode 132.

The second band portion 132b is a portion extending from the head portion 132a to portions of the first, second, fifth, and sixth surfaces 1, 2, 5, and 6 of the capacitor body 110 to improve fixing strength or the like.

The first and second external electrodes 131 and 132 may further include plating layers.

The plating layers may include first and second nickel (Ni) plating layers and first and second tin (Sn) plating layers covering the first and second nickel plating layers, respectively.

Figure 2:
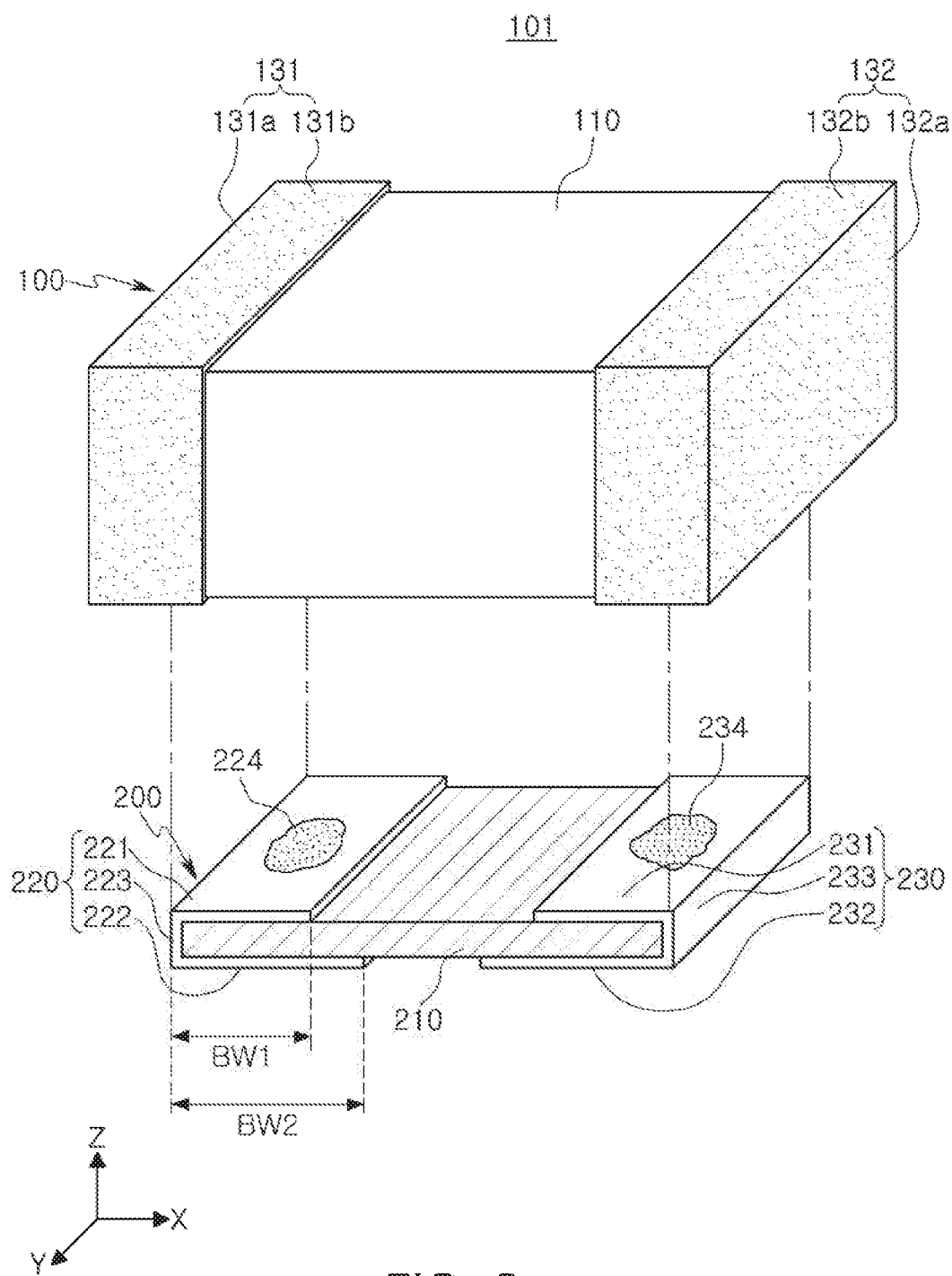
FIG. 2 is an exploded perspective view of FIG. 1.

FIG. 1 is a perspective view of an electronic component according to an exemplary embodiment in the present disclosure, and FIG. 2 is an exploded perspective view of FIG. 1.

Referring to FIGS. 1 and 2, an electronic component 101 according to an exemplary embodiment includes a multilayer capacitor 100 and an interposer 200.

The interposer 200 includes an interposer body 210, and first and second external terminals 220 and 230 disposed on both end portions of the interposer body 210, respectively in an X direction.

The interposer 200 has a Z-directional thickness of 0.5 mm or less.

The interposer body 210 may be formed of ceramic, for example, alumina.

The X-directional length and the Y-directional width of the interposer body 210 may be less than an X-directional length and a Y-directional width of the capacitor body 110, respectively.

The first and second external terminals 220 and 230 may be provided with voltages having different polarities and may be connected to first and second band portions 131b and 132b of the first and second external electrodes 131 and 132, respectively, to be connected to each other.

The first external terminal 220 includes a first bonding portion 221, a first mounting portion 222, and a first connection portion 223.

The first bonding portion 221 is a portion disposed on atop surface of the interposer body 210, and has one end exposed through one surface of the interposer body 210 and connected to the first band portion 131b of the first external terminal 131 in the X direction.

A conductive adhesive layer 224 is provided between the first bonding portion 221 and the first band portion 131b to bond the first bonding portion 221 and the first band portion 131b to each other.

The conductive adhesive layer 224 may be formed of a high-temperature solder or the like.

The first mounting portion 222 is a portion disposed on a bottom surface of the interposer body 210 to face the first bonding portion 221 in a Z direction and may serve as a terminal during board mounting.

The first connection portion 223 may be disposed on one end surface of the interposer body 210 in the X direction and serves to connect an end portion of the first bonding portion 221 and an end portion of the first mounting portion 222 to each other.

Accordingly, the first external terminal 220 may be provided to have '['-shaped X-Z end portions.

The first mounting portion 222 may have a length BW2 greater than a length BW1 of the first bonding portion 221 in an X direction.

The length BW1 of the first bonding portion 221 may be 0.3 mm or more, and the length BW2 of the first mounting portion 222 may be 0.5 mm or less.

The second external terminal 230 may include a second bonding portion 231, a second mounting portion 232, and a second connection portion 233.

The second bonding portion 232 is a portion disposed on the top surface of the interposer body 210 and has one end exposed through the other surface of the interposer body 210 in the X direction and connected to the second band portion 132b of the second external electrode 132.

A conductive adhesive layer 234 may be provided between the second bonding portion 231 and the second band portion 132b. The conductive adhesive layer 234 may be formed of a high-temperature solder or the like.

The second mounting portion 232 is a portion disposed on the bottom surface of the interposer body 210 to face the second bonding portion 231 of the interposer body 210 in the Z direction and may serve as a terminal during board mounting.

The second connection portion 233 is disposed on the other end surface of the interposer body 210 in the X direction and serves to connect an end portion of the second bonding portion 231 and an end portion of the second mounting portion 232 to each other.

Accordingly, the second external terminal 230 may be provided to have ']'-shaped X-Z end portions.

The second mounting portion 232 may have a length BW2 greater than a length BW1 of the second bonding portion 231 in the X direction.

The length BW1 of the second bonding portion 231 may be 0.3 mm or more, and the length BW2 of the second mounting portion 232 may be 0.5 mm or less.

If necessary, plating layers may be further provided on surfaces of the first and second external terminals 220 and 230.

The plating layers may include a nickel plating layer and a tin plating layer covering the nickel plating layer.

When the first and second external electrode 131 and 132 disposed in the electronic component 100 are applied with voltages having different polarities while the electronic component 100 is mounted on a board, the capacitor body 110 is expanded and contracted in the Z direction by an inverse piezoelectric effect of the dielectric layer 111.

The contraction and expansion cause generation of vibration.

The vibrations may be transferred to the board through the first and second external electrodes 131 and 132 and the first and second external terminals 220 and 230. Thus, acoustic sound may be radiated from the board to be an acoustic noise.

The interposer 200 according to an exemplary embodiment may be attached to a first surface side, a mounting direction of the multilayer capacitor 100, to prevent the vibrations of the multilayer capacitor 100 from being transferred to the board. Thus, the acoustic noise of the multilayer capacitor 100 may be reduced.

In detail, the multilayer capacitor 100 is bonded to the interposer 200 while being laminated in such a manner that an internal electrode is perpendicular to a mounting surface of the interposer 200. Therefore, an effect of preventing the vibration from being transferred from the multilayer capacitor 100 to the board may be improved to further reduce the acoustic noise.

When an X-directional length of a bonding portion of an external terminal of an interposer is defined as BW1 and an X-directional length of a mounting portion of the external terminal is defined as BW2, fixing strength tends to decrease although vibrations of a multilayer capacitor tend to be reduced as the lengths BW1 and BW2 decrease.

In such a type of electronic component, a portion that is most vulnerable in terms of fixing strength is a boundary on which a multilayer capacitor and an interposer are bonded. Therefore, the length BW1 has a most important impact on the fixing strength of the electronic component.

In an exemplary embodiment, a mounting portion has a length greater than a length of a bonding portion. Thus, vibrations transferred from a multilayer capacitor to a board may be reduced and fixing strength may be secured during board mounting to prevent poor mounting.

As a result, the lengths of the mounting portion and the bonding portion of the external terminal of the interposer may be adjusted to secure the fixing strength while reducing acoustic noise of the electronic component.

EXPERIMENTAL EXAMPLE

Figure 5:
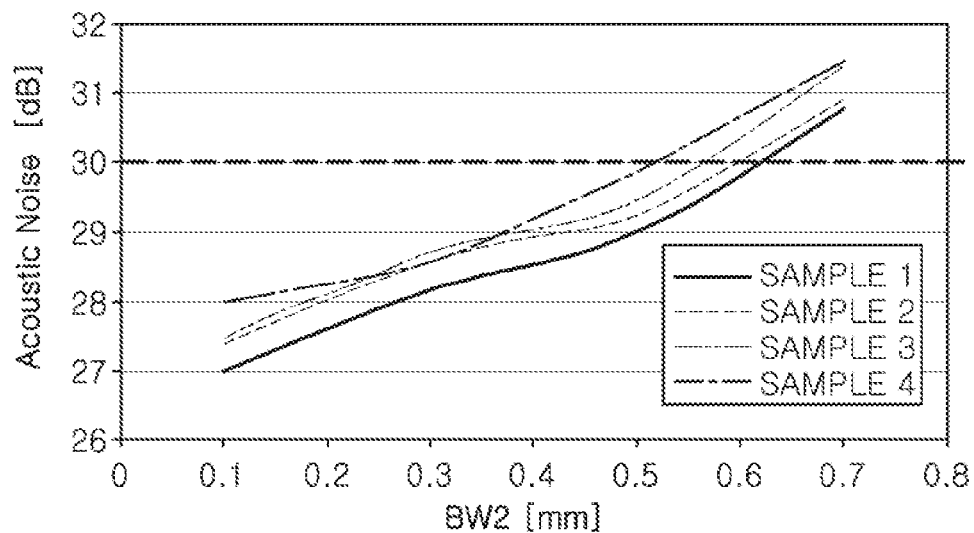
FIG. 5 is a graph illustrating acoustic noise of an electronic component depending on length variations of an external terminal and a bonding portion.
Figure 6:
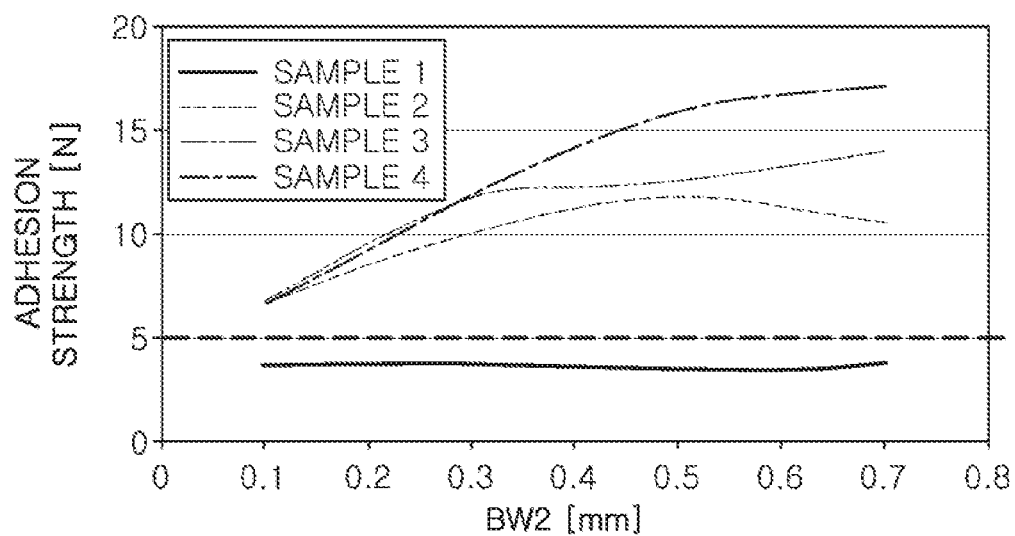
FIG. 6 is a graph illustrating fixing strength of an electronic component depending on length variations of an external terminal and a bonding portion.

FIG. 5 is a graph illustrating acoustic noise of an electronic component depending on length variations of an external terminal and a bonding portion, and FIG. 6 is a graph illustrating fixing strength of an electronic component depending on length variations of an external terminal and a bonding portion. Table (1) shows detailed values of results shown in FIGS. 5 and 6.

In Table (1), BW1 denotes an X-directional length of one of first and second bonding portions of first and second external terminals of an interposer, and BW2 denotes an X-directional length of one of first and second mounting portions of first and second external terminals of the interposer.

In the experimental example, an interposer was fabricated while varying BW1 and BW2 between 0.1 mm and 0.7 mm, a multilayer capacitor was mounted on the interposer to prepare an electronic component, the electronic component was mounted on a printed circuit board (PCB) using a solder, and acoustic noise and fixing strength were measured.

In FIGS. 5 and 6, sample 1 is a case in which BW1 is 0.1 mm, sample 2 is a case in which BW1 is 0.3 mm, sample 3 is a case in which BW1 is 0.5 mm, and sample 4 is a case in which BW1 is 0.7 mm.

By increasingly applying a force to an X-Z surface of the electronic component mounted on the PCB, strength at the moment when the electronic component is separated from the electronic component is checked to determine whether the fixing strength is poor or not.

TABLE (1)

| Interposer | | Fixing Strength | | | Acoustic |
|---|---|---|---|---|---|
| BW1 [mm] | BW2 [mm] | Force [N] | Result OK/NG | Destruction Position BW1/BW2 | Noise [dB] |
| 0.1 | 0.1 | 3.7 | NG | BW1 | 27.0 |
|  | 0.3 | 3.8 | NG | BW2 | 28.2 |
|  | 0.5 | 3.5 | NG | BW1 | 29.0 |
|  | 0.7 | 3.7 | NG | BW1 | 30.8 |
| 0.3 | 0.1 | 6.7 | OK | BW2 | 27.4 |
|  | 0.3 | 10.1 | OK | BW1 | 28.6 |
|  | 0.5 | 11.8 | OK | BW1 | 29.3 |
|  | 0.7 | 10.6 | OK | BW1 | 30.9 |
| 0.5 | 0.1 | 6.9 | OK | BW2 | 27.5 |
|  | 0.3 | 11.7 | OK | BW2 | 28.7 |
|  | 0.5 | 12.6 | OK | BW1 | 29.5 |
|  | 0.7 | 14.0 | OK | BW1 | 31.4 |
| 0.7 | 0.1 | 6.4 | OK | BW2 | 28.0 |
|  | 0.3 | 12.0 | OK | BW2 | 28.6 |
|  | 0.5 | 15.9 | OK | BW1 | 29.9 |
|  | 0.7 | 17.2 | OK | BW1 | 31.5 |

The mounting portion of the external terminal serves as a medium to transfer vibration of the electronic component to the PCB, and values of BW2 are related to acoustic noise.

Referring to Table (1) and FIG. 5, acoustic noise was measured to be less than or equal to 30 dB when BW2 was less than or equal to 0.5 mm.

It can be seen that, for example, BW2 should be 0.5 mm to maintain an acoustic noise reduction effect below a certain level.

The bonding portion of the external terminal is a portion disposed to bond the multilayer capacitor and the interposer to each other, and values of BW1 are related to fixing strength.

Referring to Table (1) and FIG. 6, when BW1 is 0.1 mm, poor fixing strength was observed at all strengths.

When BW was 0.3 mm or more, poor fixing strength was not observed at all strengths.

It can be seen that, for example, BW1 should be 0.3 mm or more to secure fixing strength of a certain level or higher.

According to an exemplary embodiment, fixing strength of a certain level or higher may be secured during board mounting while maintaining an acoustic noise reduction effect of an electronic component above a certain level. Thus, poor mounting may be prevented.

While exemplary embodiments have been shown and described above, it will be apparent to those skilled in the art that modifications and variations could be made without departing from the scope of the present invention as defined by the appended claims.

What is claimed is:
1. An electronic component comprising:
   a multilayer capacitor including a capacitor body and first and second external electrodes disposed on both ends of the capacitor body, respectively; and
   an interposer including an interposer body and first and second external terminals disposed on both ends of the interposer body, respectively,
   wherein each of the first and second external terminals includes a first conductive layer disposed on a top surface of the interposer body facing the multilayer capacitor, a second conductive layer disposed on a bottom surface of the interposer body, and a connection portion disposed on an end surface of the interposer to connect the first conductive layer and the second conductive layer to each other, and any portion of the first conductive layer of the first external terminal has a length in a length direction, connecting the first and second external terminals, which is less than a length in the length direction of the second conductive layer of the first external terminal, and any portion of the first conductive layer of the second external terminal has a length in the length direction, which is less than a length in the length direction of the second conductive layer of the second external terminal.

2. The electronic component of claim 1, wherein the external terminals have '['-shaped and ']'-shaped end portions.

3. The electronic component of claim 1, wherein the interposer body has a length and a width smaller than a length and a width of the capacitor body, respectively.

4. The electronic component of claim 1, wherein the interposer body is formed of alumina.

5. The electronic component of claim 1, wherein the capacitor body has first and second surfaces disposed to oppose each other, third and fourth surfaces connected to the first and second surfaces and disposed to oppose each other, and fifth and sixth surfaces connected to the first and second surfaces as well as the third and fourth surfaces and disposed to oppose each other, and includes a plurality of dielectric layers and a plurality of first and second internal electrodes alternately disposed with the dielectric layers interposed therebetween, and ends of the first internal electrodes and ends of the second internal electrodes are exposed through the third and fourth surfaces, respectively.

6. The electronic component of claim 5, wherein the first and second external electrodes include connection portions disposed on the third and fourth surfaces of the capacitor body, respectively, and band portions extending from the connection portions to a portion of the first surface of the capacitor body.

7. The electronic component of claim 6, further comprising:

adhesive layers respectively provided between the band portions and the first conductive layers.

8. The electronic component of claim 5, wherein the plurality of dielectric layers and the plurality of first and second internal electrodes are alternately disposed with the dielectric layers interposed therebetween in a direction of connection of the fifth and sixth surfaces.

9. The electronic component of claim 1, further comprising:

plating layers respectively provided on surfaces of the first and second external electrodes and the first and second external terminals.

10. The electronic component of claim 1, wherein the first conductive layer of the first external terminal has an edge opposing an edge of the first conductive layer of the second external terminal, and each of the edges of the first conductive layers of the first and second terminals linearly extends in a width direction crossing the length direction.

11. The electronic component of claim 1, wherein each of the edges of the first conductive layers of the first and second terminals linearly extends from an edge of the interposer body to another edge of the interposer body opposing the edge of the interposer body in the width direction.

12. The electronic component of claim 1, wherein each of the first conductive layers has a length of 0.3 millimeter or more and each of the second conductive layers has a length of 0.5 millimeter or less.

13. An electronic component comprising:

a multilayer capacitor, including a capacitor body, and a pair of external electrodes disposed on both ends of the capacitor body, respectively; and an interposer, including an interposer body, and a pair of external terminals disposed on both ends of the interposer body, respectively, wherein the pair of external terminals include bonding portions disposed on a top surface of the interposer body, mounting portions disposed on a bottom surface of the interposer body, and connection portions disposed on end surfaces of the interposer to connect the bonding portions and the mounting portions to each other, the mounting portions have lengths greater than lengths of the bonding portions in a direction of connection of the pair of external terminals, and wherein each of the bonding portions has a length of 0.3 millimeter or more and each of the mounting portions has a length of 0.5 millimeter or less.

* * * * *